(12) United States Patent
Vrhel, Jr.

(10) Patent No.: US 8,839,231 B2
(45) Date of Patent: Sep. 16, 2014

(54) METHOD AND SYSTEM FOR SOFTWARE INSTALLATION

(75) Inventor: Thomas Vrhel, Jr., Woodinville, WA (US)

(73) Assignee: Dell Products L.P., Round Rock, TX (US)

( * ) Notice: Subject to any disclaimer, the term of this patent is extended or adjusted under 35 U.S.C. 154(b) by 1391 days.

(21) Appl. No.: 11/950,417

(22) Filed: Dec. 4, 2007

(65) Prior Publication Data

US 2009/0144725 A1    Jun. 4, 2009

(51) Int. Cl.
*G06F 9/445* (2006.01)

(52) U.S. Cl.
CPC ... *G06F 8/60* (2013.01); *G06F 8/63* (2013.01)
USPC .......................................... 717/175; 717/177

(58) Field of Classification Search
CPC ....................................................... G06F 8/60
USPC ................................. 717/168–178
See application file for complete search history.

(56) References Cited

U.S. PATENT DOCUMENTS

| | | | |
|---|---|---|---|
| 6,968,350 B2* | 11/2005 | Traut et al. ..................... | 707/205 |
| 7,146,612 B2 | 12/2006 | Sedlack | |
| 7,356,679 B1* | 4/2008 | Le et al. ........................... | 713/1 |
| 7,580,826 B2* | 8/2009 | Vega et al. ....................... | 703/24 |
| 7,606,339 B2* | 10/2009 | Pirzada et al. ................. | 375/350 |
| 2004/0025154 A1* | 2/2004 | Sedlack ......................... | 717/168 |
| 2005/0229175 A1 | 10/2005 | McCrory et al. | |
| 2006/0218544 A1* | 9/2006 | Chakraborty et al. ........ | 717/168 |
| 2007/0006205 A1 | 1/2007 | Kennedy et al. | |
| 2007/0006218 A1 | 1/2007 | Vinberg et al. | |

* cited by examiner

*Primary Examiner* — Ted T Vo
(74) *Attorney, Agent, or Firm* — Baker Botts L.L.P.

(57) ABSTRACT

A method for installing software on an information handling system (IHS) is provided, the method including receiving data associated with a plurality of hardware components and a plurality of software components, providing a plurality of software devices corresponding to the data, transferring the plurality of software devices to a virtual hard drive of a virtual machine and capturing an image of the virtual hard drive on an image storage.

14 Claims, 5 Drawing Sheets

METHOD AND SYSTEM FOR SOFTWARE INSTALLATION

BACKGROUND

1. Technical Field

The present disclosure relates generally to the field of information handling systems. More specifically, but without limitation, the present disclosure relates to a software installation for hardware to be assembled for an information handling system.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more IHSs, data storage systems, and networking systems.

The flexibility in the hardware and software that may be used in an information handling system (IHS) allows it to be used for a variety of complex processes. However, as an IHS incorporates additional hardware and software, the system becomes more complex. In order to configure an IHS consistently with a customer's demands, installation and configuration of software may be performed after the hardware is assembled. After the software is installed on the assembled IHS, the IHS may then be tested to ensure that the system is performing properly. The time required for installing, configuring, and testing software on the IHS may be a substantial part of the assembly process.

Pre-installing an operating system (OS) and other software as a base layer may reduce the assembly time of an IHS. By packaging the OS and other programs in an image instead of just a bare OS image, time is saved by not having to install the other programs on the OS after assembly. For example, some non-hardware-specific applications may be preinstalled into the OS image. However, this solution may not bind drivers to the OS prior to assembly of the IHS and this solution may not be able to install applications that require specific hardware to be present for their installation (e.g. DVD-burning software may require the DVD burner to be present at installation).

A set of software may also be created (e.g. plurality of software devices) to be installed on an IHS in an image. The image is used to self configure the IHS according to a customer's order and the hardware found in the IHS. However, the solution may not self-configure the software until the IHS is assembled and the image is placed on the IHS.

Thus a need remains for methods and systems for capturing a disk image containing an installed and configured plurality of software corresponding to a customer's order prior to assembly of the hardware of an IHS.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method for installing software on an information handling system (IHS). The method comprises receiving data associated with a plurality of hardware components and a plurality of software components, providing a plurality of software devices corresponding to the data, transferring the plurality of software devices to a virtual hard drive of a virtual machine, and capturing an image of the virtual hard drive on an image storage Another aspect of the disclosure provides an installation system for installing software on an information handling system. The system comprises a virtual installation system receiving data comprising a plurality of hardware components and a plurality of software components. The virtual installation system may comprise a library containing a plurality of software devices, wherein the plurality of software devices corresponding to the data are provided and a virtual machine, wherein the plurality of software devices are transferred to a virtual hard drive of the virtual machine, and the virtual installation system captures an image of the virtual hard drive. The system may also comprise an image storage, wherein the image storage stores the image.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Figure 1:
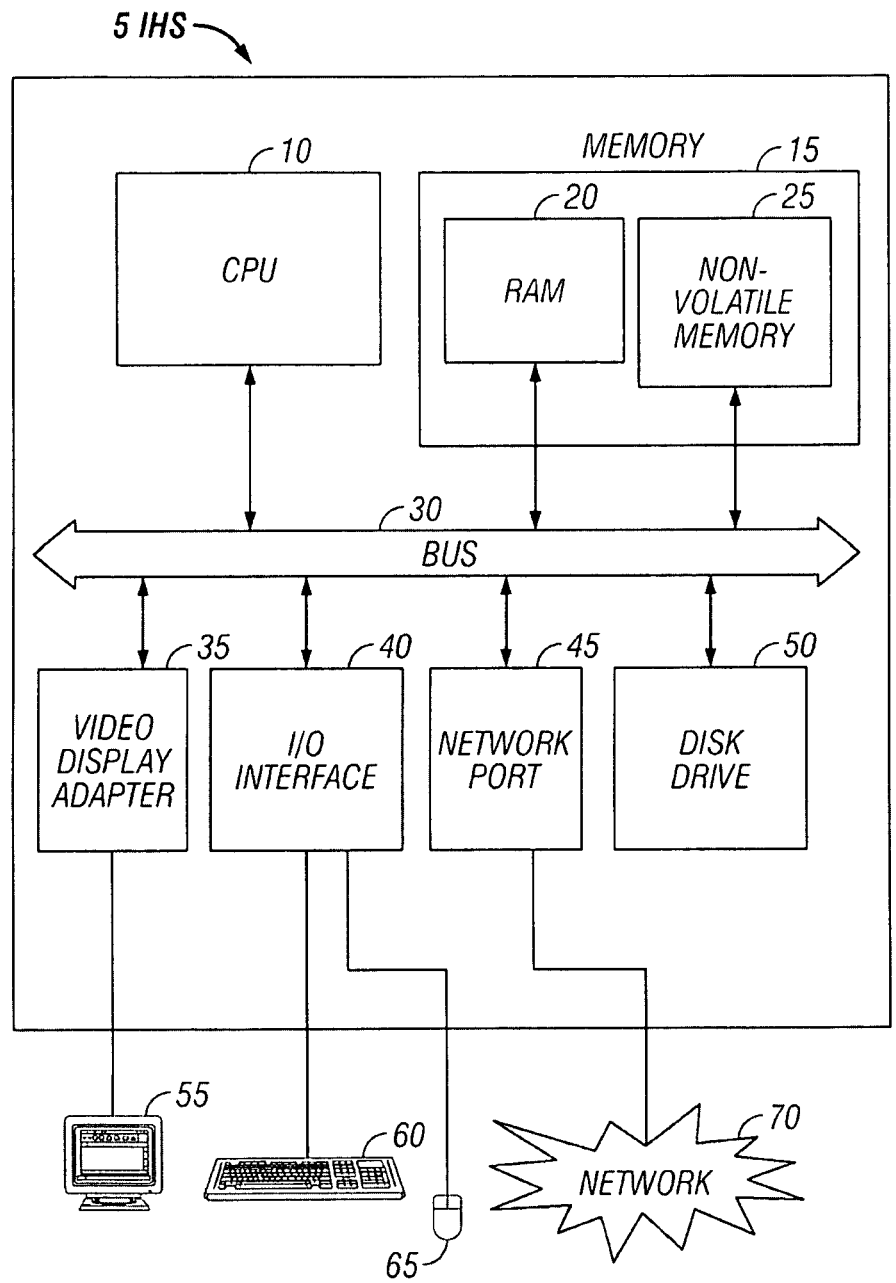
FIG. 1 shows a schematic of an information handling system according to the present disclosure.

Although the invention as been described with reference to specific implementations, it will be understood by those skilled in the art that various changes may be made without departing from the spirit or scope of the invention. Various examples of such changes have been given in the forgoing description. Accordingly, the disclosure of implementations of the disclosure is intended to be illustrative of the scope of the invention and is not intended to be limiting. It is intended that the scope of the invention shall be limited only to the extent required by the appended claims. For example, to one of ordinary skill in the art, it will be readily apparent that the information handling system discussed herein may be implemented in a variety of implementations, and that the forgoing discussion of certain of these implementations does not necessarily represent a complete description of all possible implementations.

For simplicity and clarity of illustration, the drawing and/or figures illustrate the general manner of construction, and descriptions and details of well known features and techniques may be omitted to avoid unnecessarily obscuring the disclosure.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required to control a keyboard 60, mouse 65, video display 55 and/or other input/output devices not shown here. The memory may also comprise RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Currently, when a customer orders an IHS, the software (e.g. applications/programs, operating system (OS), drivers, patches, and other software) used by the IHS is installed after the hardware is assembled. For example, after the hardware is assembled, the hardware may be placed in a testing and installation system or a burn rack. The burn rack may test the hardware, install and configure the software (OS, applications/programs, drivers, patches, etc.), and perform additional quality testing. The time spent in the burn rack or the time spent installing the software and performing testing to ensure that the software is operating correctly and properly bound to the OS may be substantial. If software installation, configuration, and testing were performed before and/or during the hardware assembly, the time between the receipt of a customer's order and delivery of the order could be reduced significantly by reducing burn rack time. However, some software may need to perform hardware initialization and binding to be properly installed. For example, some operating systems may not be able to install drivers unless the corresponding hardware component is present (e.g. Microsoft XP). Further, some software applications/programs may validate licensing keys against hardware. Since the hardware may be needed to properly install some software components, manufacturers may not be able to create and test a completed plurality of software devices for a customer prior to assembly of the hardware.

For the most part, virtualization has been used for server consolidation, creating a secure sandbox for a browser, and software testing. Virtualization technology provides a virtual environment for a guest operating system to execute. The virtual environment provides the guest OS with a small set of old and stable devices that may be simulated using device emulators that map to the underlying hardware in the host operating system. For example, the device emulator may mimic the operation of a processor, a sound card, a network interface card, a video card, and/or any other hardware component in an IHS. The present disclosure provides a system and a method for using a virtual environment created according to a customer's specific needs to assist an installation, configuration and testing of software in an IHS prior to assembling a customer's IHS.

Figure 2:
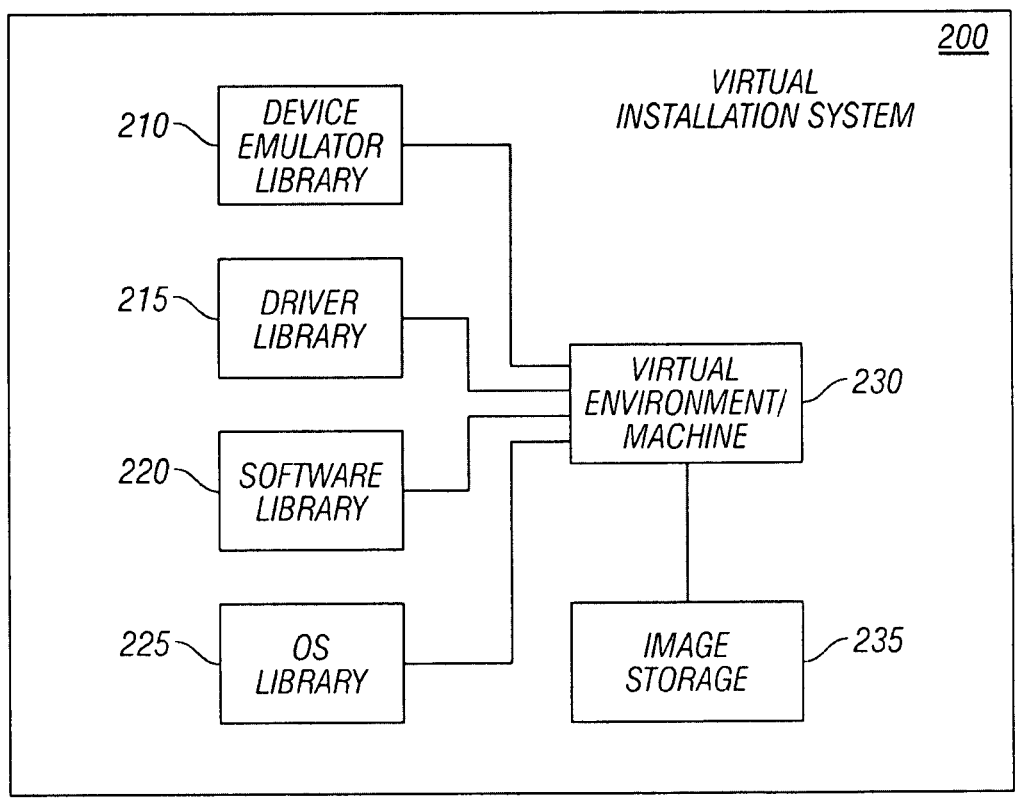
FIG. 2 depicts one possible implementation of a virtual installation system.

FIG. 2 provides one possible implementation of an information handling system (IHS) that provides a virtual installation system. A virtual installation system 200 may aid in the installation, configuration, and testing of software components captured by a disk image to be installed in an IHS ordered by a customer. A customer's order may have several hardware and software components. Hardware components may include any hardware that may be used in an IHS such as a CPU, motherboard, hard disk drive, sound card, video card, network card, modem, etc. The software components may include any software that may be used in an IHS such as an operating system, drivers, applications/programs, emulators, etc. A virtual installation system 200 may include a device emulator library 210, a driver library 215, a software library 220, and an operating system (OS) library 225. The device emulator library may contain software that allows the virtual installation system to create virtual devices in the virtual environment that correspond to hardware elements in the customer's order. The driver, software, and OS libraries may contain software elements to be installed on a customer's IHS. For example, the device emulator may have an emulator corresponding to a particular brand and model of a video card. When a virtual IHS is built by a virtual installation system utilizing the libraries, a virtual environment/machine 230 operates in the same manner as the assembled hardware of a customer's order. This allows simulating and testing the operation of an IHS without having to assemble hardware.

It is understood that the virtual installation system 200 is not limited to the libraries shown in FIG. 2. In some situations, a customer's order may require additional data not provided in the libraries shown. For example, a customer may order Windows XP and request that all current updates to Windows XP be installed. A patch library containing OS and/or other software patches could be provided in the virtual installation system in order to meet the requirements of the customer's order. While the libraries in FIG. 2 are shown locally within the virtual installation system, in another implementation, the libraries may be remotely coupled to the virtual installation system through a network or the like.

The virtual installation system 200 may also include a virtual environment/machine 230. A virtual environment/machine 230 may be created based on a customer's order. Device emulators corresponding to hardware elements in a customer's order are retrieved from a device emulator library 210 and installed on a virtual environment/machine 230. The device emulators allow the virtual environment/machine 230 to simulate the hardware elements in a customer's order. For example, the virtual environment/machine 230 may have a virtual processor, a virtual hard disk drive, a virtual sound card, a virtual video card or the like. Each of the virtual hardware elements may represent a piece of hardware in a customer's order. In addition, the virtual environment/machine 230 may retrieve software such as drivers, programs/applications, an operating system, and/or patches from the driver library 215, software library 220, the OS library 225 and/or any other libraries present according to a customers order.

The virtual environment/machine 230 may then begin to install the software in accordance with a customer's order. After the software is installed, configured and the drivers bound to the device emulators, the virtual environment/device 230 can be tested for various factors such as proper installation of the software components, proper binding of the drivers to the device emulators, and the like. For example, the event logs, result codes, and/or any other type of process validation may be checked to ensure proper installation and operation. In another implementation, the virtual installation system 200 can be modified to handle multiple orders.

After completion of the installation, testing, and configuration, an image of the virtual environment/machine's 230 virtual drive (not shown) may be captured and sent to an image storage 235. The image storage 235 may be local to the virtual installation system 200 or the image storage 235 may be remotely coupled to the virtual installation system 200 through a network or the like. The image storage 235 may store a single or several captured image(s) of virtual drives so they can be retrieved in the future to complete the customer's order. The stored image(s) corresponding to a customer's order may be transferred to a local storage device (e.g. hard drive) before or while the hardware in the customer's order is being assembled or the image may be transferred to a local storage device after the hardware is assembled.

Figure 3:
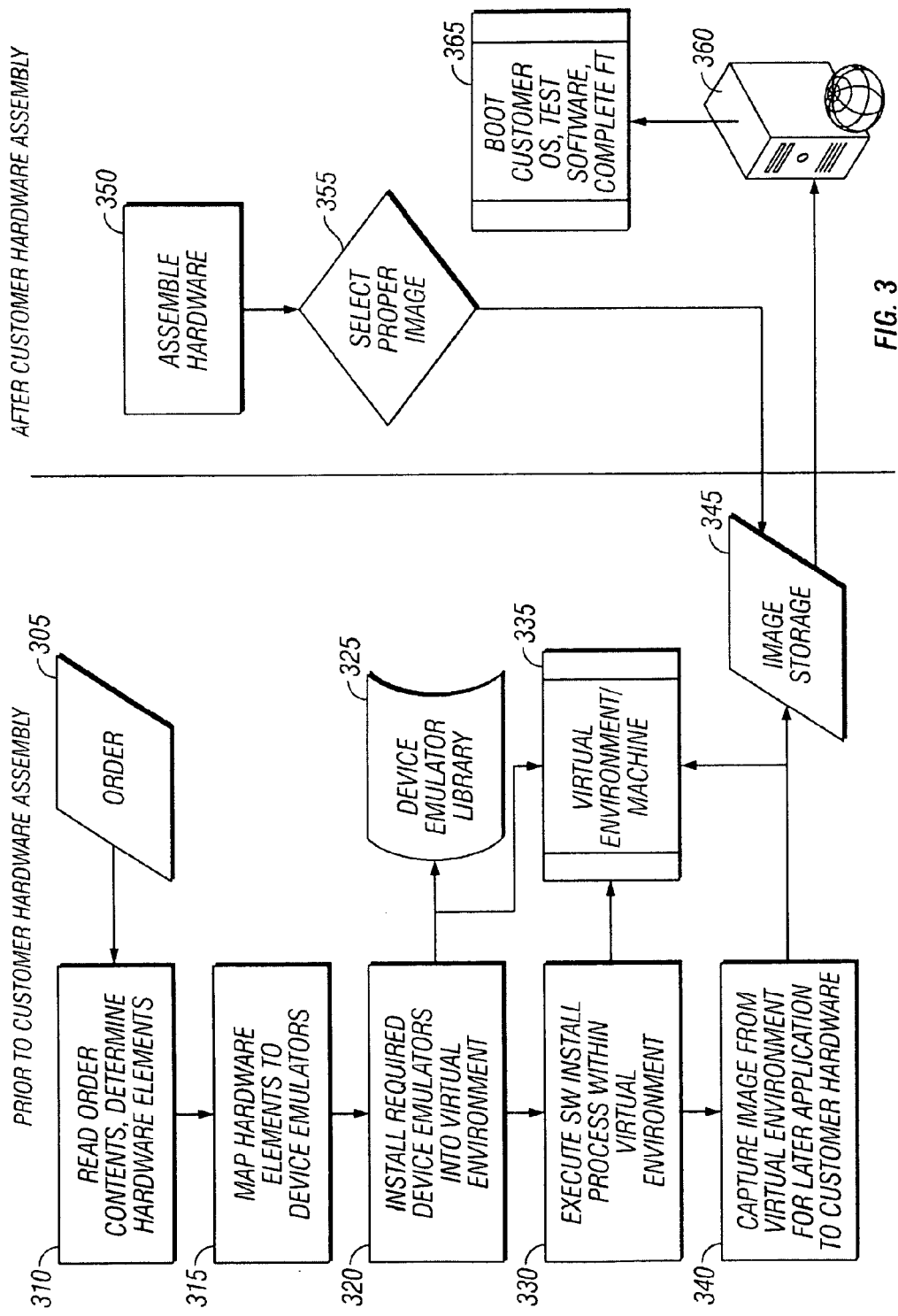
FIG. 3 illustrates one possible implementation of a software installation virtualization process.

FIG. 3 illustrates an implementation of a method for software installation virtualization. Various methods are contemplated including all or less than all of the steps shown in methods described herein and/or mentioned below, any number of repeats or any of the steps shown and/or mentioned below, and in any order. In step 305, a customer's order is received specifying particular hardware and software elements/components that the customer desires in an IHS. Data representing the order may be read and parsed to separate the hardware and software elements in step 310. Data representing the order may be provided by an order form, electronically, or by any other suitable method. The hardware elements may be compared to any device emulators installed on a virtual environment/machine 335. If a device emulator corresponding to a hardware element is not present in the virtual environment/machine 335, then the device emulator may be located in a library of device emulators 325. The hardware elements may be mapped to corresponding device emulators in step 315. For example, if the customer's order includes a specific sound card, then a device emulator is mapped to the corresponding sound card in the device emulator library 325.

In step 320, the device emulators corresponding to the hardware elements in a customer's order are installed in a virtual environment/machine 335 allowing the virtual environment/machine to simulate an IHS containing the hardware elements in the customer's order. In the software installation step 330, software devices or elements such as the operating system (OS), drivers, patches, programs/application, or the like are installed on a virtual environment/machine 335. Software devices may be installed on a virtual disk according to specific requirements or settings in a customer's order. For example, a customer may want the OS to be stored in a second partition of a hard drive. Software elements may be layered into a plurality of software devices for a software download phase. In the software download phase, the plurality of software devices is transferred to the virtual disk of the virtual machine. The virtual machine is rebooted, and the OS on the virtual machine can be operated to install the drivers, patches, programs/applications, or the like. The software installation process in the virtual environment operates as if the device emulators are actual hardware. This allows the drivers to bind to the device emulators as they would to actual hardware. Without the virtual environment and device emulators, most of the software installation process could not be performed until the actual hardware in a customer's order is assembled.

In addition, the virtual machine may be tested to ensure proper operation and installation of the device emulators and software. This may include testing the compatibility of the software components and hardware, testing if the drivers are properly bound, checking event logs and result codes, and any other suitable quality or performance testing. Once the testing is complete, an image of the virtual disk can be captured in step 340. The captured image may be stored in an image storage in step 345 so that it may be copied to a hard disk to be installed in the IHS the customer ordered. While these processes are occurring in a virtual environment, assembly of the hardware may be occurring simultaneously, before, and/or after in step 350.

After the customer's hardware elements have been assembled, an image corresponding to a customer's order may be selected from the image storage in step 355 and copied to a hard drive in step 360 for the IHS the customer ordered. In another implementation, the image may be copied to a hard drive prior to or during the assembly of an IHS. After the image is copied to the hard drive of the IHS, the system is booted and the hardware and/or software components may be tested for proper operation if desired in step 365. Once the final testing (FT) is complete in step 365, the assembled IHS may be delivered to a customer. The method may provide the ability to completely install all drivers, applications, and patches (e.g. quick fix engineerings (QFEs)) and to test the results installation prior to assembly of any hardware.

Figure 4:
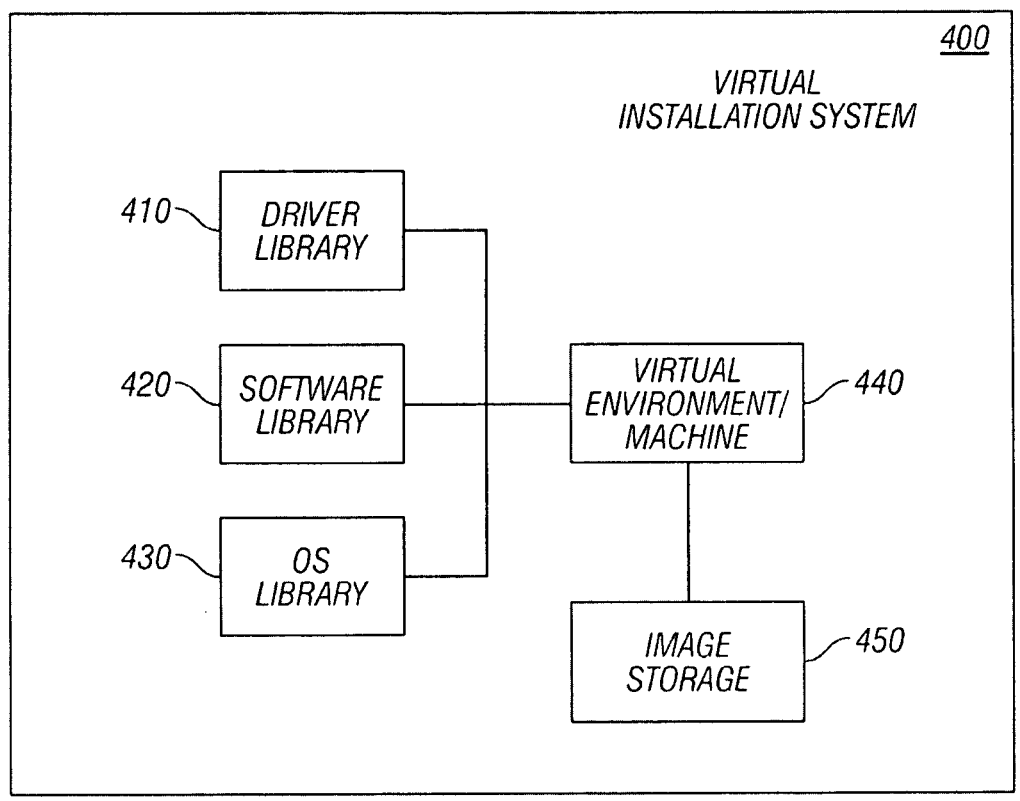
FIG. 4 provides another implementation of a virtual installation system.

FIG. 4 provides another implementation of a virtual installation system. A virtual installation system 400 is similar in some aspects to the virtual installation system shown in FIG. 2. However, in the virtual installation system 400 shown in FIG. 4, a device emulator library is not present as shown in FIG. 2. A driver library 410, software library 420, and OS library 430 provide drivers, software applications/programs including patches, and operating systems for a virtual environment/machine 440.

An OS and applications/programs may be installed on the virtual environment/machine 440 according to a customer's order. However, the drivers are only loaded into the virtual environment/machine 440 and not installed. Without corresponding device emulators to simulate the behavior of the hardware, the drivers cannot perform device initialization and binding. Therefore, the drivers cannot be installed in a virtual environment/machine 440 without the proper device emulators.

In this particular implementation, a virtual installation system may configure and test software and/or the OS in a virtual environment/machine 440, but it may not be able to test if the drivers have been properly bound. An image of a virtual disk in a virtual environment/machine 440 is then captured and stored in an image storage 450. The captured image may be transferred to a local storage device (e.g. hard disk) before, during, or after the assembly of the hardware elements in the customer's order.

After all the hardware elements have been assembled, including the hard disk, the IHS (not shown) may be booted. The OS may identify new hardware in the IHS using plug-and-play or another suitable method. Since the drivers have already been loaded in the image copied to the hard drive, the IHS may not need to download the drivers. The pre-loaded drivers may perform device initialization and binding to the hardware elements in the IHS. The IHS may then be tested for proper operation and sent to the customer.

Figure 5:
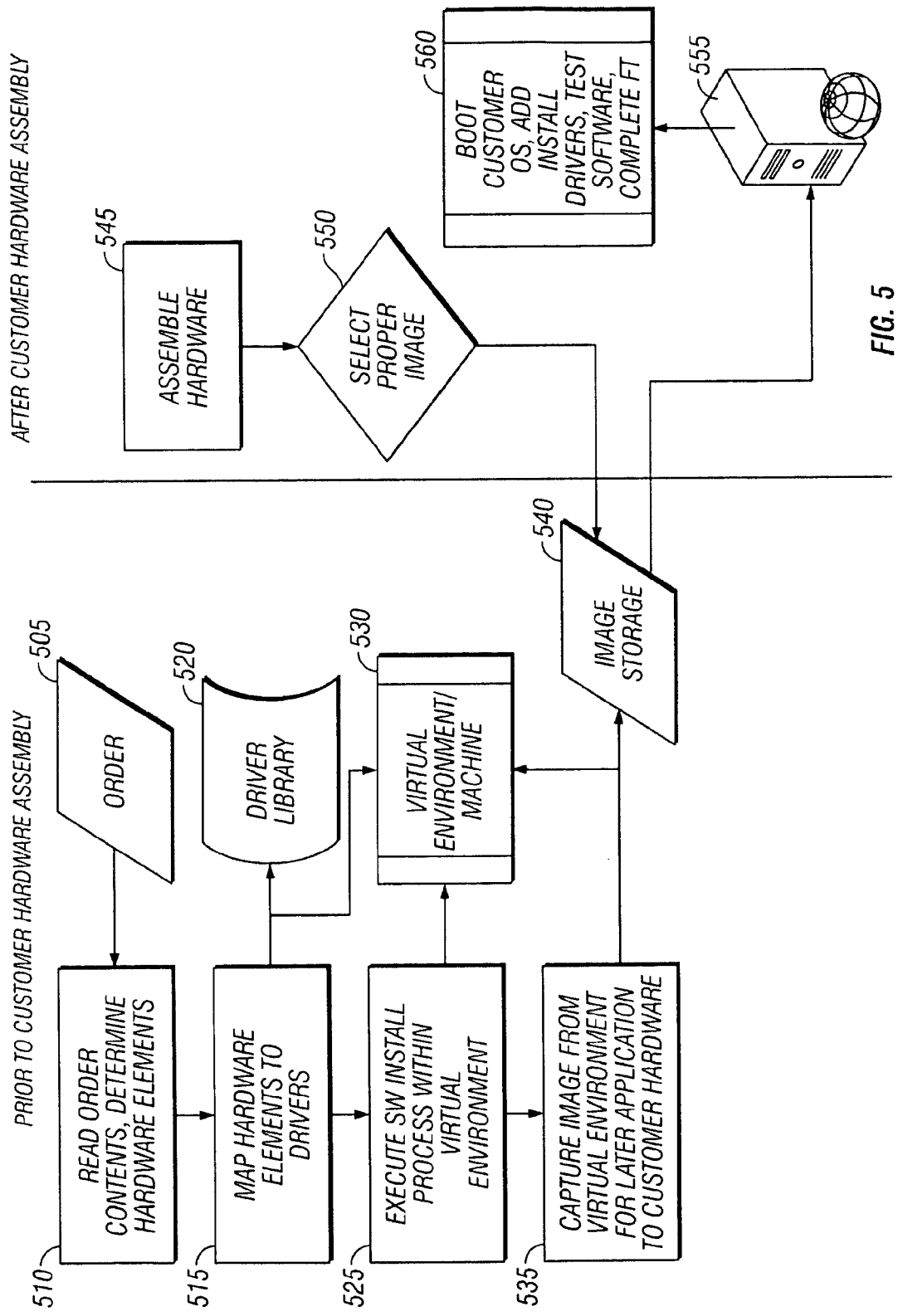
FIG. 5 illustrates another implementation of a software installation virtualization process.

FIG. 5 illustrates another implementation of a method for software installation virtualization. Prior to hardware assembly, a customer's order is received in step 505 by a vendor. The order is read and parsed to determine the hardware elements in the customer's order in step 510. The hardware elements may be compared to any drivers stored on a virtual environment/machine 530. If a driver corresponding to a hardware element is not present in the virtual environment/machine 530, then the driver may be located in a library of drivers in step 515. In step 515, the hardware elements are then mapped to drivers in a driver library 520.

In the software installation process in step 525, the drivers are loaded into the virtual environment 530, and the software applications/programs, OS, patches, or the like are installed in the virtual environment. The software installation in step 525 is similar to the software installation process discussed regarding FIG. 3. However, in this particular implementation, the drivers are not installed. Instead, the drivers are merely copied to a virtual disk of the virtual machine 530. In the software installation, testing may also occur on the virtual environment/machine 530 to determine if the software applications/programs, OS, patches, or the like have been properly installed.

Next, an image of the virtual disk is captured 535 and stored in an image storage 540. The stored image selected from the image storage 550 may be transferred to a hard drive 550 before, during, or after the hardware elements in the customer's order are assembled 545. When the hardware elements in the customer's order are completely assembled, including the hard drive with the image, the customer's IHS may then be booted 560.

After the IHS is booted, the hardware elements will be recognized using plug-and-play or a suitable method for detecting hardware. Once the hardware elements are recognized, the corresponding drivers may be installed to allow the hardware elements to operate in the IHS properly. However, since the drivers have been pre-loaded into the image copied on the hard drive, the drivers do not have to be downloaded from internet, retrieved from a disk, or the like. The drivers may be installed right away and properly bound to corresponding hardware elements in step 560. In addition, the software may be tested for proper installation and any additional final testing may be done in step 560. Once the final testing (FT) is complete in step 560, the assembled IHS may be shipped to the customer.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method for installing software on a first information handling system, the method comprising:
    creating a virtual machine on a second information handling system, the virtual machine being substantially identical in configuration to the first information handling system by emulating, with one or more device emulators, a plurality of hardware components to be assembled on the first information handling system;
    receiving data associated with the plurality of hardware components to be assembled and a plurality of software components to be installed on the first information handling system;
    providing a plurality of software devices corresponding to the data;
    during assembly of the plurality of hardware components on the first information handling system, installing the plurality of software devices on the virtual machine according to the received data and storing the result on a virtual hard drive of the virtual machine;
    capturing an image of the virtual hard drive on an image storage device; and
    installing the captured image on the first information handling system from the image storage device.

2. The method of claim 1, wherein the image storage device is one of the plurality of hardware components of the first information handling system.

3. The method of claim 1, wherein the plurality of software devices comprises a driver, an application, or some combination thereof.

4. The method of claim 3, wherein the driver corresponds to one of the plurality of hardware components and the device emulator simulates one of the plurality of hardware components.

5. The method of claim 3, wherein the device emulator is plugged into the virtual machine, and the application and the driver are located and installed on the virtual machine.

6. The method of claim 3 further comprising:
    booting the first information handling system; and
    installing the driver, wherein the driver is bound to an operating system.

7. The method of claim 5, wherein the driver is bound to an operating system on the virtual machine.

8. A first information handling system comprising:
    a virtual installation system receiving data comprising a plurality of hardware components to be assembled and a plurality of software components to be installed in a second information handling system, wherein the virtual installation system comprises:
        a library containing a plurality of software devices, wherein the plurality of software devices corresponding to the received data are provided; and
        a virtual machine, said virtual machine being substantially identical in configuration to the second information handling system by emulating, with one or more device emulators, a plurality of hardware components to be assembled on the second information handling system, wherein during assembly of the plurality of hardware components on the second information handling system, the plurality of software devices are installed on the virtual machine according to the received data and the results stored on to a virtual hard drive of the virtual machine, and the virtual installation system captures an image of the virtual hard drive; and an image storage, wherein the image storage stores the image.

9. The system of claim 8, wherein the image is copied to one of the plurality of hardware components.

10. The system of claim 8, wherein the plurality of software devices comprises a driver, an application, or some combination thereof.

11. The system of claim 10, wherein the driver corresponds to one of the plurality of hardware components and the device emulator simulates one of the plurality of hardware components.

12. The system of claim 10, wherein the device emulator is plugged into the virtual machine, and the application and the driver are located and installed on the virtual machine.

13. The system of claim 10, wherein the second information handling system is booted and the driver is installed, wherein the driver is bound to an operating system.

14. The system of claim 12, wherein the driver is bound to an operating system on the virtual machine.

* * * * *